(No Model.) 4 Sheets—Sheet 1.

S. C. JONES.
PHOTOGRAPHIC CAMERA SHUTTER.

No. 515,230. Patented Feb. 20, 1894.

Witnesses:
J. E. Bates
M. W. McRoden

Inventor.
Seth C. Jones
By Howard L. Osgood
Atty.

(No Model.) 4 Sheets—Sheet 2.

S. C. JONES.
PHOTOGRAPHIC CAMERA SHUTTER.

No. 515,230. Patented Feb. 20, 1894.

Witnesses:
H. E. N. Bates
M. W. McRoden

Inventor.
Seth C. Jones
By
Howard L. Osgood
Atty.

(No Model.) 4 Sheets—Sheet 3.

S. C. JONES.
PHOTOGRAPHIC CAMERA SHUTTER.

No. 515,230. Patented Feb. 20, 1894.

Witnesses:
H. E. N. Bates
M. W. McRoden.

Inventor,
Seth C. Jones
By Howard D. Osgood
Atty.

(No Model.) 4 Sheets—Sheet 4.
S. C. JONES.
PHOTOGRAPHIC CAMERA SHUTTER.
No. 515,230. Patented Feb. 20, 1894.
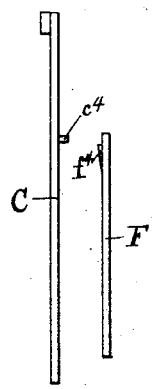
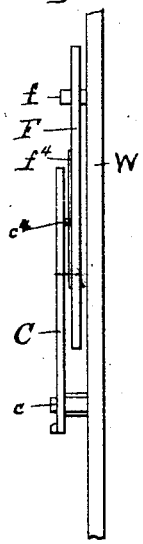
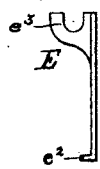
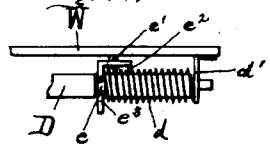
Witnesses
Frederick M. Bush.
A. N. Bowman
Inventor
Seth C. Jones
by Howard L. Osgood
Atty

UNITED STATES PATENT OFFICE.

SETH C. JONES, OF ROCHESTER, NEW YORK.

PHOTOGRAPHIC-CAMERA SHUTTER.

SPECIFICATION forming part of Letters Patent No. 515,230, dated February 20, 1894.

Application filed January 26, 1893. Serial No. 459,904. (No model.)

*To all whom it may concern:*

Be it known that I, SETH C. JONES, a citizen of the United States, and a resident of the city of Rochester, in the county of Monroe and State of New York, have invented certain new and useful Improvements in Photographic-Camera Shutters, of which the following is a specification, reference being had to the accompanying drawings, in which—

Figure 1:
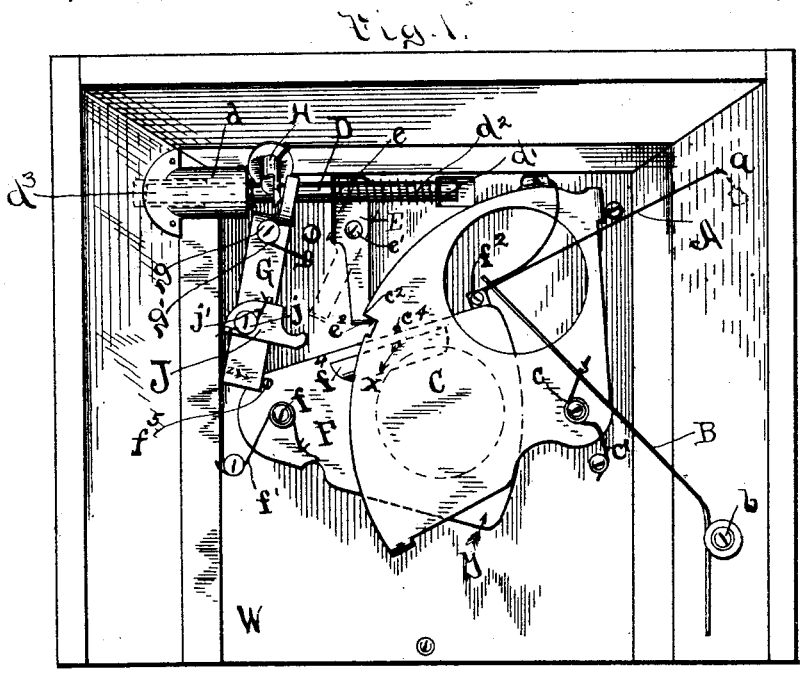
Figure 4:
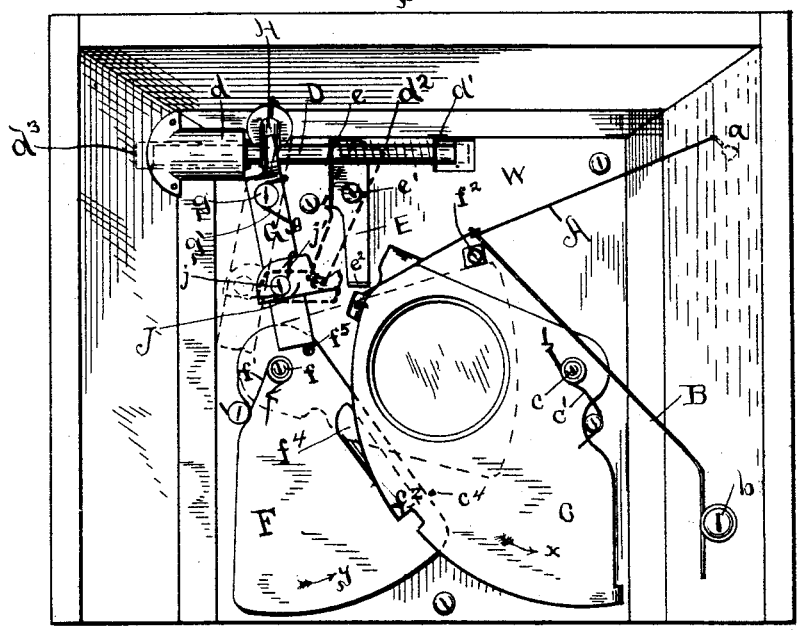
Figure 3:
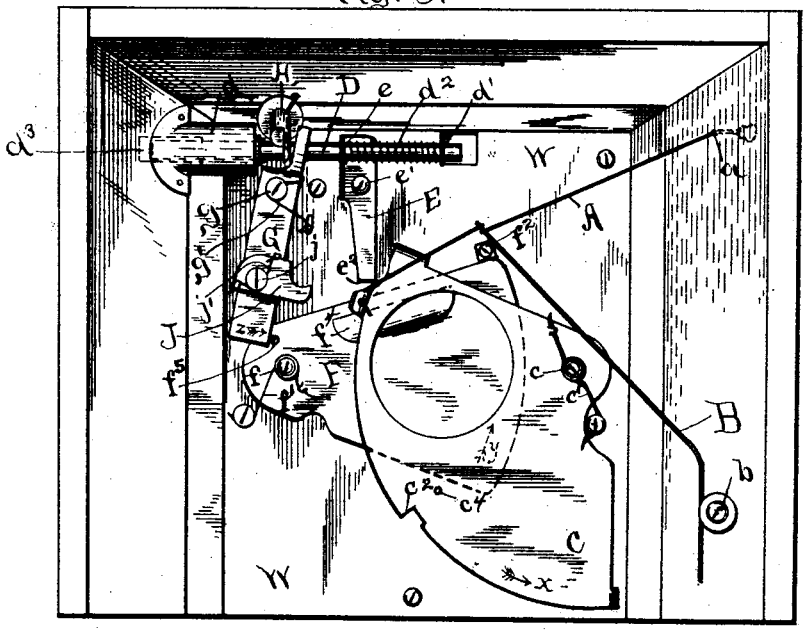
Figure 2:
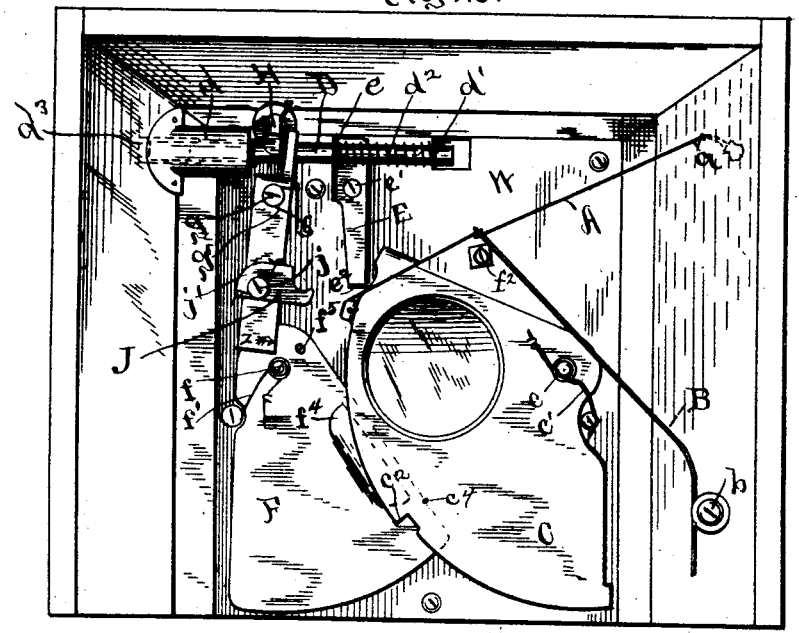
Figure 6:
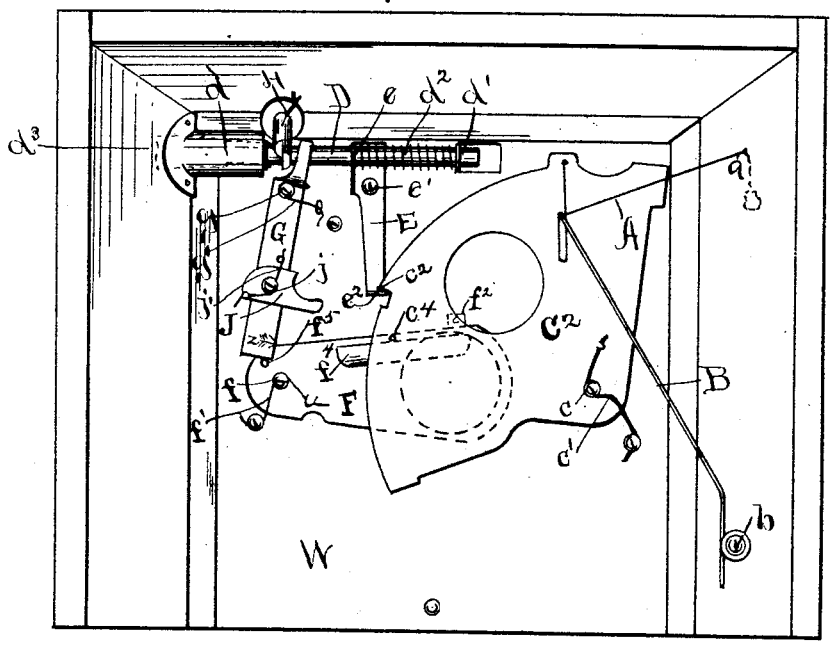
Figure 5:
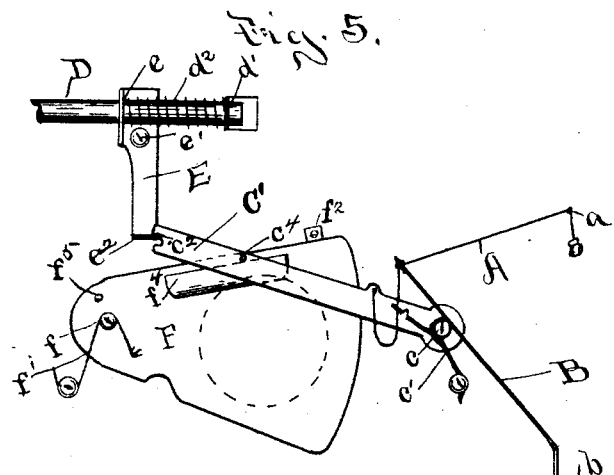

Figure 1 is a plan view of my shutter set ready to be operated for instantaneous exposure. Fig. 2 is a plan view thereof at the moment of instantaneous exposure. Fig. 3 is a plan view thereof after an instantaneous exposure and the return of the exposing shutter, but before the plate is re-set. Fig. 4 is a plan view thereof when open for time exposure, and Figs. 5 and 6 are modifications. Fig. 7 is an end elevation of the arm or plate and of the shutter shown separate from other parts. Fig. 8, is a top view of the arm or plate and the shutter, showing the pivotal connections of each, the contact edge on the shutter and the lug or pin on the plate; other parts being omitted in order to show construction clearly. Fig. 9, is a side elevation of the catch for the arm or plate showing the yoke thereon. Fig. 10, is a top plan view of the mechanism for operating the catch.

My invention relates to a photographic camera shutter in which an exposing shutter is moved away from the lens opening by a detachable motor and is more particularly set forth in the description and claims of this specification.

The object of my invention is to provide a shutter which is easy to construct and to operate and which is easily adapted at will to instantaneous or time exposures.

In the drawings, A is a cord which passes through a small hole in the camera box and is attached to the end of a spring lever B, which is fastened at a suitable point inside the box as at $b$. The cord extends from the end of the spring lever to a projection on a plate C, which is pivoted to the inner side W of the front of the camera box and near the lens opening, by a suitable pivot $c$. A motor spring $c'$ tends to press this plate in the direction shown by the arrow marked $x;$ and in the re-set position, shown in Fig. 1, this spring is compressed and is held in this position by the catch E hereinafter described. This plate C, in the form of shutter which I prefer, has a perforation therein which is of the same area as the lens opening, and which is in such a position therein as to register with the lens opening, when the plate C has reached the end of its motion, as shown in Figs. 2, 3 and 4. The spring lever B keeps the cord A stretched between it and the hole $a$, through which the cord passes to the outside of the camera box, but relieves that portion of the cord which extends from the lever to the plate C, of all strain, except when the cord is pulled from the outside of the box to re-set the plate C. The spring lever and cord constitute a re-setting device for the plate C.

In a suitable position on the inner side W of the front of the camera box, is a rod set in suitable bearings $d$ $d'$ and capable of longitudinal movement therein. A catch E pivoted to the case at $e'$ has on one end a yoke $e^3$, (see Figs. 9 and 10,) which straddles the rod D and fits into a groove therein at $e$. A spring $d^2$ tends to press the rod in one direction and is conveniently a coiled spring wound around said rod between the bearing $d'$ and the yoke on the catch E. This spring presses against the yoke, which thus moves the rod in the direction of expansion of the spring. A lug or offset $e^2$ on the other end of the catch E engages with a tooth $c^2$ projecting from the edge of the plate C, when said plate is drawn back to re-set the same and to compress the motor spring $c'$. The spring $d^2$ thus operates both the catch E and the rod D. Said plate C has also a pin $c^4$ which extends from its face toward the lens opening for the purpose hereinafter described.

The plate C is pivoted, as shown, to the inner face W of the front of the camera box and on one side of the lens opening. On a pivot $f$, preferably on the opposite side of the lens opening and near the same, is hung an imperforate vibrating exposing shutter F, which lies between the plate C and the lens opening in the front of the camera box. A shutter spring $f'$ tends to turn the shutter F around the pivot $f$ in the direction shown by the arrow marked $y$, and holds the shutter against a stop $f^2$, so that it normally covers the lens opening. The shutter F also bears on its face next to the plate C a beveled projection or plate $f^4$ upon one edge of which projection or plate the pin $c^4$ bears, when the plate C is moved by the motor spring $c'$ in the direction shown by the arrow marked $x$ to vibrate the shutter F to make an exposure. The motor spring $c'$ is stronger than the returning spring $f'$ and when the catch E is released from the tooth $c^2$ by pressing the push button $d^3$ on the end of the rod D, the plate C will vibrate, the pin $c^4$ will press against the edge of the projection or plate $f^4$ and the motor spring $c'$ will cause the shutter F to move from its normal position of closing the lens opening, and will compress the weaker spring $f'$ until the shutter reaches the end of its vibration, when the pin $c^4$ slides off the end of the projection or plate $f^4$, as shown in Fig. 2, whereby the plate C is disengaged from the shutter F. The plate C stops against the side of the camera box or against a suitable stop, but the shutter F (being released from the action of the motor spring $c'$, transmitted through the plate C and the pin $c^4$) snaps back to its normal position against the stop $f^2$ under the action of the returning spring $f'$, whereupon the shutter F again closes the lens opening. During the operation just described, the shutter F is pushed away from its normal position of covering the lens opening and permits the lens opening to be exposed, in this instance, by the opening in the plate C moving into a position registering with said lens opening, and, immediately after the exposure, the shutter F, returned by the spring $f'$, closes the lens opening and ends the exposure. The plate C may then be returned to the re-set position of Fig. 1, by pulling the cord A and causing the plate C to revolve about its pivot, compressing the motor spring $c'$ until the tooth $c^2$ re-engages with the lug or offset $e^2$ of the catch E. After pressing the push button $d^3$ and releasing the plate C, the spring $d^2$ returns the catch E into a position to engage immediately with the tooth $c^2$, whenever the plate C returns to the re-set position.

The catch E and the tooth $c^2$ constitute a detent and releasing device for operating the shutter F through the plate C. When the plate C is returned to the re-set position, the pin $c^4$ snaps over the bevel of the projection or plate $f^4$ (as the plate is made of elastic material) into position to press against the engagement edge thereof.

The foregoing description shows the operation of my shutter for instantaneous exposures.

Upon the shutter F and near the pivot $f$ is a pin $f^5$.

To the inner side of the front of the camera box and near the catch E is a latch G, which is hung upon a pivot $g$. A spring $g'$ tends to press this latch constantly in the direction of the arrow marked $z$ Fig. 1. The latch has a flat end and is of proper length to engage with the pin $f^5$, when the shutter F is turned to its extreme lowest position, as shown in Fig. 4, provided the latch G is permitted to swing about its pivot. The pin $f^5$ being eccentric upon the shutter F presses the latch G backward against the force of its spring $g'$ by means of the stronger spring $f'$, but when the shutter turns about its pivot, the eccentrically placed pin $f^5$ moves out of the way of the latch, permitting the spring $g'$ to move the latch forward, so that the end of the latch presses against the pin $f^5$ and locks the shutter in the open position of Fig. 4. A cam or slotted pin H is pivoted on the inside of the camera box with a handle extending through the same, and is so placed as to engage with the latch G, so that when the cam or pin H is turned in one position, the latch G is held so that it cannot turn about its pivot (as shown in Figs. 1, 2 and 3) but when turned in the other position, (as shown in Fig. 4,) the latch is permitted to vibrate about its pivot.

Upon the latch G is a swinging plate J pivoted at $j$ and held in position by a spring $j'$. This swinging plate bears against the lug or offset $e^2$ of the catch E, when the latch G holds the shutter F wide open, and if now, the push button $d^3$ is pressed in, the catch E turning about its pivot, will press against the plate J and will push the latch G out of engagement with the pin $f^5$ (see dotted lines, Fig. 4) whereupon the shutter F is released from the latch and impelled by its spring $f'$, returns to its position of covering the lens opening. The plate J is made to swing, so that the lug or offset $e^2$ of the catch E may swing over the plate J as the latch G swings in the direction of the arrow marked $z$, but when the catch E returns to position, the plate J will snap upward and will set itself to press against the catch.

The operations in making time exposures are as follows:—The plate C having been brought to the re-set position of Fig. 1, the tooth $c^2$ being held by the catch E, the cam or pin H is so turned as to permit the latch G, when freed from the pin $f^5$, to swing about its pivot. The push button is pressed, the plate C is released and impelled by the motor spring $c'$, vibrates about its pivot, pushing before it the shutter F and exposing the lens opening. At the end of the vibration, the pin $c^4$ slides off the end of the plate $f^4$, but the spring $g'$ moves the latch G about its pivot $g$ and the end of the latch slips over the pin $f^5$ and holds the shutter F open against the tension of its spring $f'$, and the lens opening is held uncovered. After the catch E is released from the tooth $c^2$, the rod D is returned to position by the spring $d^2$ carrying with it the catch E, and the plate J snaps upward and into position against the catch E. This position of the parts will be retained until the push button $d^3$ is pressed a second time, when the catch $e$ will press against the plate J of the latch G and will disengage the latch from the pin $f^5$, thus permitting the shutter F to be returned by the spring $f'$ to cover the lens opening, as shown by dotted lines in Fig. 4. The plate C may now be returned to the re-set position, by pulling the cord A and the operation may be repeated for time exposure, or by turning the cam or pin H the device may be arranged for instantaneous exposure. The plate C is, in function, only a pivoted or vibrating arm provided with a motor spring $c'$ and means, such as the pin $c^4$, for operating the shutter F against its weaker returning spring $f^5$, and said plate is adapted to disengage from the shutter F at the end of an exposure (whether instantaneous or time) whereupon the returning spring $f'$ causes the shutter F to return to cover the lens opening, immediately in instantaneous exposures, but in time exposures, after being disengaged from the latch G. It is obvious that the form of the plate or arm C, is not confined to any specific form, but that it may be a narrow arm, as C' of Fig. 5, or may be simply a spring operating the exposing shutter against its returning spring. If, however, the plate C is wide and the perforation in it is so placed that the perforation completely passes the lens opening to make the exposure, which opening is immediately covered by the plate after exposure, said plate then becomes an exposing shutter as in the modified form $C^2$, shown in Fig. 6, and the shutter F becomes an auxiliary shutter which covers the lens opening while the plate $C^2$ is retracted to the re-set position. In other words, the main function of the plate C is to communicate the force of the motor spring $c'$ to the shutter F to expose the lens opening. These modifications of my device are dependent not upon changes in the mechanism herein described, but only upon the width of the plate C or the position of a perforation therein.

My shutter is, among other things, easily and quickly adapted to instantaneous or time exposures, and when set for one or the other kind of exposure, operates certainly; and by my shutter one side of the lens opening may be exposed longer than the other side thereof in instantaneous exposures, and, if the pivot of the exposed shutter is set on one side of the lens opening, my device permits the ground side of the lens (shown shaded in Fig. 2) to be exposed first and to be covered last, thus giving maximum of exposure to the ground and the minimum of exposure to the sky.

What I claim is—

1. In a photographic camera shutter, the combination of a shutter having a contact edge and a shutter spring normally holding the shutter in position to cover the lens opening, an elastic arm or plate guided in a path intersecting the path of motion of the shutter and provided with a pin adapted to engage said contact edge and to disengage therefrom at the end of motion of the shutter in one direction, means for returning the arm or plate to reset position, whereby the elastic arm or plate yields to permit the pin to ride over the contact edge to re-engage therewith, substantially as described.

2. In a photographic camera shutter, the combination of a vibrating shutter and a vibrating arm or plate pivoted on opposite sides of the lens opening, said arm or plate moving across and behind said shutter, a detachable connection between said arm and said shutter, a spring operating said arm or plate whereby to move said shutter through said connection, a weaker shutter spring for returning said shutter to cover the lens opening and a detent and releasing device for said arm or plate, and a separate detent adapted to engage said shutter to hold the same away from the lens opening and to be disengaged therefrom by said detent and releasing device, substantially as described.

3. In a photographic camera shutter, the combination of a pivoted vibrating shutter adapted to hold said shutter normally in position to cover the lens opening and provided with a contact edge and a pin, a shutter spring, a pivoted vibrating arm or plate provided with a motor spring stronger than said shutter spring and a pin adapted to engage said contact edge, a detent and releasing device for said arm or plate, a spring pressed latch adapted to engage the pin on said shutter when said shutter uncovers the lens opening, means, as a cam, for holding said latch out of position to engage with said pin and means for disengaging said latch by said detent and releasing device, substantially as described.

4. In a photographic camera shutter, the combination of the pivoted, vibrating shutter F having the radial contact edge $f^4$, the pivoted, elastic, vibrating arm or plate C provided with the pin $c^4$, the shutter and the arm or plate being so pivoted as to vibrate in arcs of intersecting circles and so as to permit contact between the pin $c^4$ and the contact edge $f^4$, the shutter spring $f'$ operating the shutter in one direction, the motor spring $c'$ operating the arm or plate in the opposite direction, the spring-pressed catch E adapted to engage the arm or plate C when the motor spring is compressed, and the push rod D for releasing said catch, substantially as described.

5. In a photographic camera shutter, the combination of the pivoted, vibrating shutter F having the radial contact edge $f^4$ and the stop-pin $f^5$, the pivoted, elastic, vibrating arm or plate C provided with the pin $c^4$, the shutter and the arm or plate being so pivoted as to vibrate in arcs of intersecting circles and so as to permit contact between the pin $c^4$ and the contact edge $f^4$, the shutter spring $f'$ operating the shutter in one direction, the motor spring $c'$ operating the arm or plate in the opposite direction, the spring-pressed catch E adapted to engage the arm or plate C when the motor spring is compressed, the push-rod D for releasing said catch, the latch G pivoted near the catch E and adapted to engage the pin $f^5$ when the shutter F is open and also adapted to be disengaged from said pin by motion of the catch E, and the spring $g'$ operating said latch, substantially as described.

SETH C. JONES.

Witnesses:
S. P. MOORE,
H. L. OSGOOD.